Oct. 10, 1950   J. W. BEAMS ET AL   2,525,197
THERMAL FLOWMETER
Filed Nov. 30, 1944   2 Sheets-Sheet 1
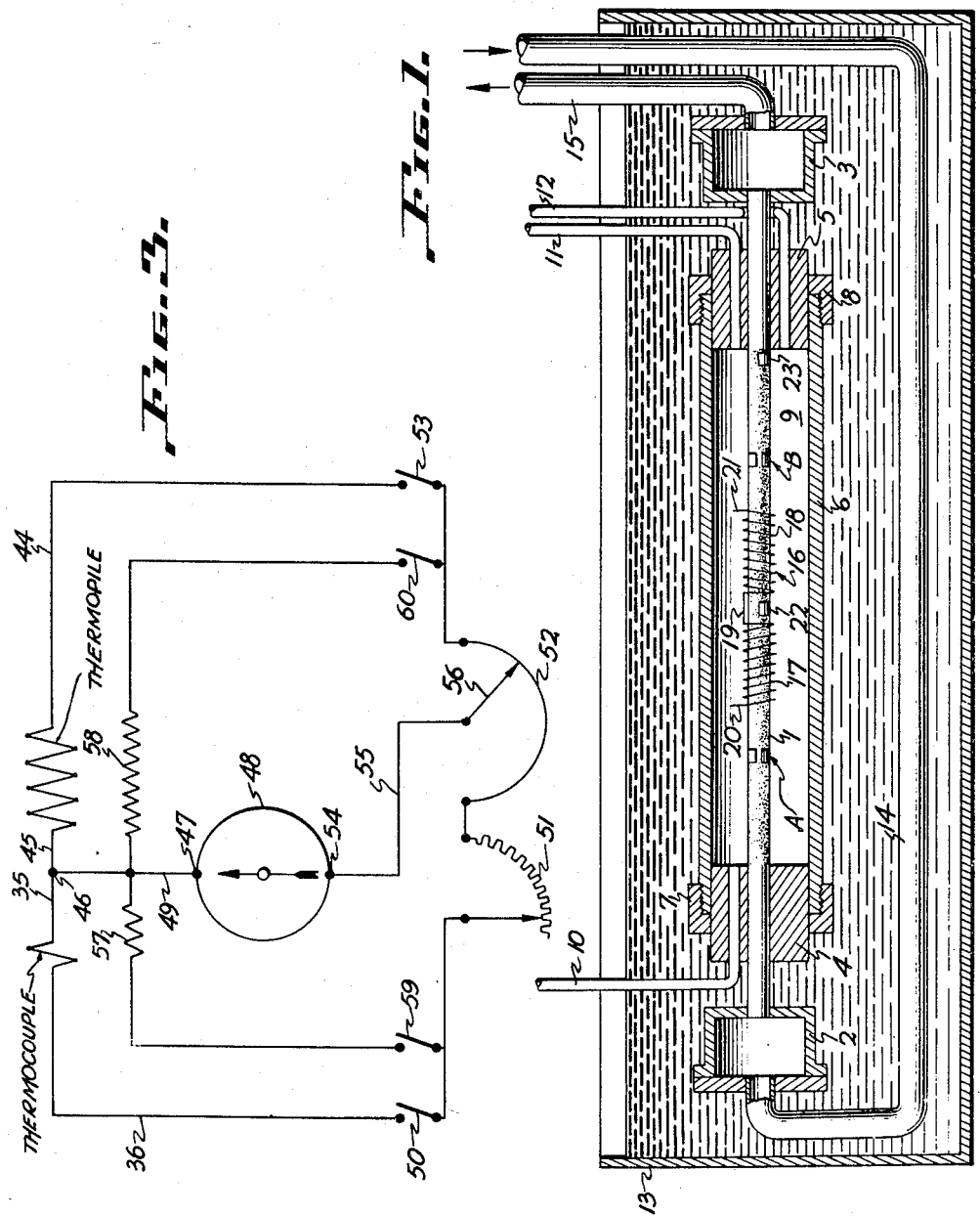
INVENTOR.
Jesse W. Beams.
Leland B. Snoddy
Llewellyn G. Hoxton
BY

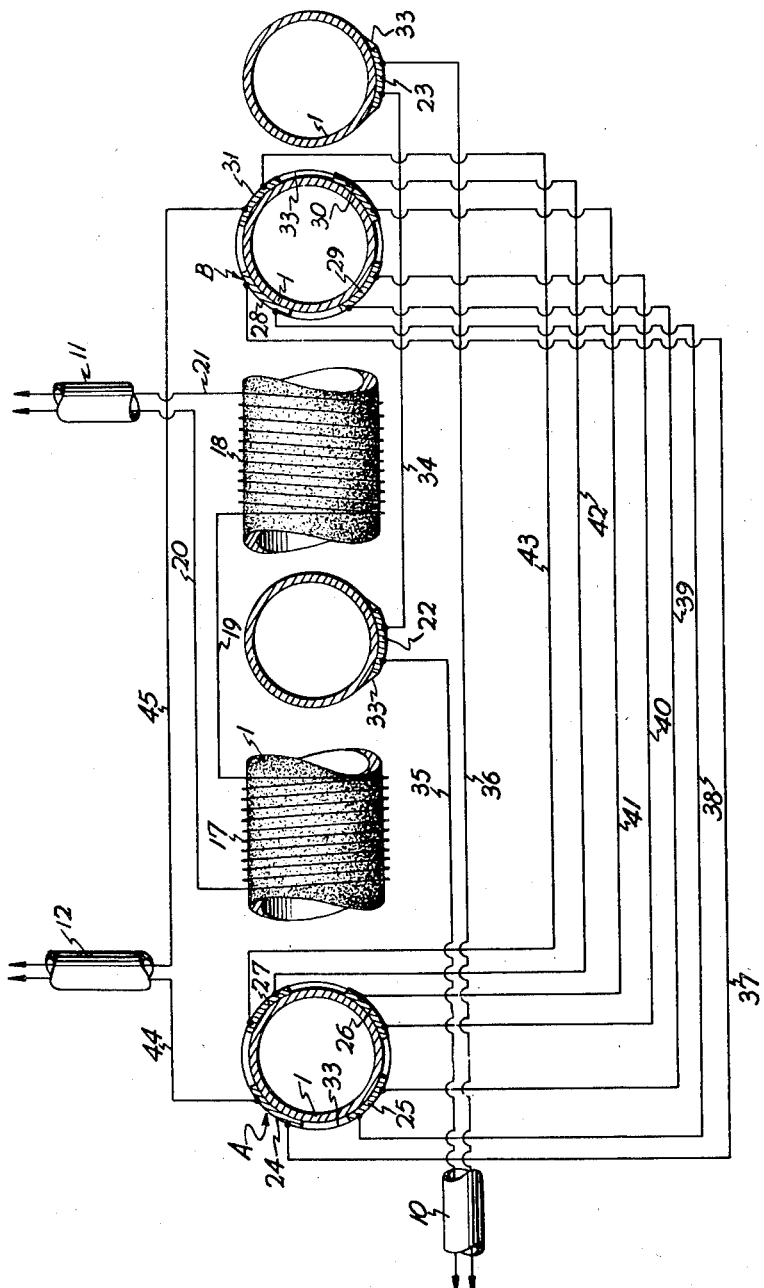

Patented Oct. 10, 1950

2,525,197

UNITED STATES PATENT OFFICE 2,525,197

THERMAL FLOWMETER

Jesse W. Beams, Leland B. Snoddy, and Llewellyn G. Hoxton, Charlottesville, Va., assignors to the United States of America as represented by the United States Atomic Energy Commission Application November 30, 1944, Serial No. 565,994

2 Claims. (Cl. 73—204)

This invention relates to new and useful devices for measuring the rate of flow of gases, and more particularly to devices that are capable of measuring the mass flow of gases at low pressures and low rates of flow.

When a gas of known specific heat is heated in a quantitative manner, the change in temperature produced by heating the gas may be used as a measure of the mass of the gas involved, and where the operation is continuous, as in the case of gas flowing through a metering tube, variations in temperature of the gas are representative of changes in the rate of mass flow of the gas in the metering tube.

In many cases it is desired to measure substantially small amounts of gas flow upon a mass flow basis where both the pressure of the gas and the rate of flow thereof are quite low. For example, in the separation of gaseous mixtures in a centrifuge by the action of centrifugal force, it is essential to efficient separation and centrifuge operation that there be available throughout the separation process an indication of the rate of flow of the gases entering and leaving the centrifuge. Metering devices for such purposes must meet certain requirements. Thus, they must be capable of measuring rates of gas flow as low as from 5 to 60 milligrams per second, and they must measure mass flow rather than velocity flow. Also, such metering devices must be accurate and, in cases where the gases to be measured are corrosive, such devices must be resistant to, and not affected by, the process gas.

Prior to the present invention there have not been available commercial metering devices that will operate to measure accurately the mass rate of flow of gases at low pressures and at low rates of flow, and the principal object of the present invention is to provide a novel metering device that meets the foregoing requirements.

More particularly, it is an object of the present invention to provide a novel metering device of the character set forth that is operable to measure accurately the mass flow of gases at rates as low as from about 5 to 60 milligrams per second.

Another object of the invention is to provide a metering device of the stated character that is operable accurately and efficiently to measure the flow of gases under minimum pressures.

Another object of the invention is to provide a metering device having the characteristics set forth that is operable to measure the flow of gases on the basis of mass flow as distinguished from velocity flow.

A further object of the invention is to provide a metering device of the stated character that will remain in operative balance at all times, thereby eliminating the necessity of extraneous balancing and control equipment.

A further object of the invention is to provide a novel method for determining the rate of mass flow of gases through a metering device effectively compensated for lack of uniformity in the heat applied to the gas.

A still further object of the invention is to provide a metering device of the character described that is resistant to corrosion and may be employed effectively to measure the flow of highly corrosive gases.

The illustrated apparatus with reference to which the invention is described herein comprises essentially an elongated metering device having associated therewith a heater for the gases flowing therethrough, and a thermocouple and thermopile operable in response to temperature differentials in the gas to generate opposing electromotive forces of different magnitude, together with means for determining the ratio between said generated electromotive forces.

The foregoing and other objects of the invention, and the various features and details of the construction and operation thereof, are hereinafter fully set forth and described with reference to the accompanying drawings, in which:

Fig. 1 is a sectional view taken vertically through a metering device embodying the present invention.

Fig. 2 is a diagrammatic view showing the relationship and wiring connections of the heater, thermocouple and thermopile that are embodied in the metering device shown in Fig. 1, and Fig. 3 is a diagrammatic view showing the circuit connections of the metering device and associated control and indicating devices.

Referring now to the drawing, and particularly to Fig. 1 thereof, reference numeral 1 designates a metering tube that has its opposite ends secured in fluid-tight relation in suitable manifolds 2 and 3, respectively. The metering tube 1 may be composed of nickel or other suitable corrosion resisting material, and preferably is thin-walled and of relatively small diameter. For example, in one metering device embodying the present invention the metering tube 1 is 12 inches in length and has an outside diameter of ⅛ inch with a 0.015 inch wall thickness.

Secured upon the metering tube 1 adjacent its ends, are cylindrical plugs 4 and 5 respectively, and secured externally of, and bridging the space between the plugs 4 and 5, is a tubular jacket 6. The metering tube 1 extends in fluid-tight relation axially through the plugs 4 and 5, and the end portions of the jacket 6 likewise are secured upon the plugs 4 and 5 in fluid-tight relation, for example, by means of threaded caps 7 and 8 respectively. There is thus enclosed about the metering tube 1, along a substantial portion of its length, a fluid-tight, or sealed, chamber 9. Leading from the chamber 9, outwardly thereof through the plug 4 is a tube 10, and similar tubes 11 and 12 lead outwardly through the plug 5. The purpose of these tubes 10, 11 and 12 will be set forth hereinafter. The exterior surface of the metering tube 1, or at least that portion thereof disposed within the chamber 9, is provided with a coating of lacquer or other suitable material, for example, "Albaline," that is electrically non-conductive.

As shown in Fig. 1 of the drawings, the metering device is adapted to be submerged in a bath of water or other suitable liquid, contained in a vessel 13, and the gas to be measured enters and leaves the metering device through inlet and outlet pipes 14 and 15 connected to the metering tube manifolds 2 and 3, respectively. Essentially, the bath in the vessel 13 is maintained at a steady, uniform temperature, and in order that gases entering the metering tube 1 may be brought into thermal equilibrium with the submerged metering device, the gas inlet pipe 14 has a sufficient portion of its length submerged in the bath to bring the gases flowing therethrough to the temperature of the bath and metering device by the time the gas enters the intake manifold 2.

Embracing the metering tube 1, substantially centrally therealong within the chamber 9 enclosed by jacket 6, is a heater coil 16 comprising two axially spaced coil sections 17 and 18, respectively, each having the same number of turns of wire therein, although under certain uses and conditions it is possible that coil sections of an unequal number of turns may be advantageously employed. These coil sections 17 and 18 are spaced apart axially of the tube 1 a predetermined distance, for example, 2 to 4 millimeters, and are serially connected together by a conductor 19. The lead wires 20 and 21 from opposite ends of said sections may pass outwardly from chamber 9 through the tube 11 for connection to a suitable source of electrical potential (not shown).

Secured to the exterior of the metering tube 1 centrally between the heater coil sections 17 and 18, is one junction 22 of a thermocouple, and the other junction 23 thereof is secured to the exterior of the tube 1 adjacent the downstream end of the chamber 9 remote from the heater coil as shown. Positioning of the junction 23 adjacent the downstream end of the device is not, however, essential, and said junction may advantageously be placed at the upstream end of the chamber 9 as desired. In addition to the thermocouple, there is provided a thermopile that comprises two junction groups A and B, respectively. The junction groups A and B are spaced apart axially of the metering tube 1 at equal distances on opposite sides of the thermocouple junction 22 as shown, and their positions are such that the junction group B is spaced approximately midway between the junctions 22 and 23 of the thermocouple. The optimum positions for the junction groups A and B, with respect to the couple junction 22 and adjacent heater coil sections 17 and 18, will be determined for each metering device, and the particular fluid medium the flow of which is to be measured. In the illustrated embodiment of the invention, and as more clearly shown in Fig. 2 of the drawings, each of the thermopile junction groups A and B comprises four junctions 24, 25, 26 and 27, and 28, 29, 30 and 31, respectively, secured in circumferentially spaced relation upon the exterior of the metering tube 1.

In order to provide a relatively large area for heat transfer from the tube 1, to the junctions of both the thermocouple and thermopile, said junctions may comprise small pieces of thin sheet copper and may be secured in position upon the metering tube 1, for example, by means of thread 33 or like non-conducting material, wound thereabout. As previously stated, the exterior surface of the metering tube 1 is coated with a suitable electrically non-conductive lacquer or the like, and hence the junctions of both the couple and pile are electrically insulated from the tube.

The circuit connections of the thermocouple and pile are shown diagrammatically in Fig. 2. As there shown, the junctions 22 and 23 are connected in series by a suitable conductor 34, and a pair of conductors 35 and 36, lead from the junctions 22 and 23, respectively, outwardly of the chamber 9 to the exterior of the device, for example, through the tube 10. Of course, the conductor 34 must be of wire of different metal than the conductors 35 and 36 and, in the illustrated embodiment of the invention, the conductor 34 may be of an alloy such as "constantan" and the conductors 35 and 36 may be of copper.

Similarly, the several junctions of the junction groups A and B of the thermopile are connected in the conventional series circuit relation. Thus junction 24 of group A is connected to junction 28 of group B by a suitable conductor 37, said junction 28 is connected to junction 25 of group A by a conductor 38, said junction 25 is connected to junction 29 of group B by a conductor 39, said junction 29 is connected to junction 26 of group A by a conductor 40, said junction 26 is connected to junction 30 of group B by a conductor 41, said junction 30 is connected to junction 27 of group A by a conductor 42, and said junction 27 is connected to junction 31 of group B by a conductor 43. A pair of conductors 44 and 45 lead from the terminal pile junctions 24 and 31, respectively, outwardly of the chamber 9 to the exterior of the device, for example, through the tube 12. As in the case of the thermocouple, alternate conductors that connect the several junctions of the groups A and B must be composed of different metals or alloys. Thus, for example, in the illustrated embodiment of the invention the thermopile conductors 37, 39, 41 and 43 may be composed of an alloy such as "constantan" and the conductors 38, 40 and 42, as well as the terminal conductors 44 and 45, may be composed of copper.

The provision of a thermopile, as distinguished from a thermocouple, at junction A and B is desirable for the reason that when gas is flowing through the tube 1 the temperature difference in the gas between A and B is quite small, and hence it is necessary that a plurality of junctions be provided at both A and B in order to obtain a sensitive response to the small temperature difference therebetween. This condition does not exist in respect to the thermocouple wherein the one junction 22 is located in the highest temperature zone along the tube 1, while the other junction 23 thereof is located at a substantially lower temperature zone therealong, with the result that a maximum temperature difference will exist between the junctions 22 and 23 of the thermocouple.

It is desirable, also, that the junction groups A and B of the thermopile be disposed equidistant from the heating coil 16 in order that the junction groups will be near the same temperature when no gas is flowing through the tube 1. Furthermore, since the thermocouple responds to the temperature at which heat is supplied to the gas relative to the temperature of the gas at a more remote point, it is desirable that the couple junctions 22 and 23 be positioned so as to respond to the maximum temperature difference in the heated gases lengthwise of the tube 1.

In addition, it is desirable that the thermopile junction groups B be positioned relatively remote from both of the thermocouple junctions 22 and 23, since if the pile junction group B is positioned too close to the couple junction 22, the temperature difference therebetween would be too small to give accurate results, and if positioned too close to the couple junction 23 the pile junction group B would be too remote from the heating coil 16 and thereby produce a temperature difference too small for accurate measurement. The optimum positions, however, are those in which, when the gas begins to flow, the temperature drop of the junctions A, and the temperature rise of the junctions B, are a maximum.

Referring now to Fig. 3 of the drawings, the lead conductor 35 of the thermocouple and the lead conductor 45 of the thermopile are connected to a common terminal 46 suitably located exteriorly of the vessel 13 in which the metering device is submerged. The terminal 46 is connected to one terminal 47 of a suitable galvanometer 48 by means of a conductor 49, and the other lead conductor 36 of the thermocouple is connected, through a switch 50 and a variable resistance 51, to one side of a slide wire 52, while the other lead conductor 44 of the thermopile similarly is connected through a switch 53 to the other side of the slide wire 52, the other terminal 54 of the galvanometer 48 being connected by a suitable conductor 55 to the slide 56 of said slide wire 52.

In this connection, it is to be noted that the thermocouple and thermopile are connected in opposite branches of a bridge circuit containing the galvanometer 48 and in such manner that the generated electromotive forces of the couple and pile are in opposition with respect to the galvanometer 48. By virtue of this arrangement, the electromotive forces generated in the couple and pile respectively, by the heater coil 16, will vary approximately in the same proportions in response to fluctuations in the current flowing through the heater coil 16, with the result that the metering device remains in balance at all times regardless of fluctuations in the heater coil temperature, and the necessity for accurate control and regulation of the current supplied to the heater 16 may be eliminated. This is so for the reason that, when no current is flowing through the galvanometer 48, the electromotive forces on the two sides of the circuit are in the same ratio as the total resistances (exterior to the galvanometer) in the corresponding sides of the circuit, and hence, for any given amount of heat in the heating coil 16, the electromotive forces generated in the couple and pile will be approximately in the same ratio to each other, with the result that it is not necessary either to adjust the slide wire 52 in accordance with fluctuations in the heating coil current, or to provide for the accurate control and regulation of the current supplied to the heating coil 16.

Connected across the galvanometer 48, in the same relationship as the couple and pile, are two resistances 57 and 58, that are preferably of low thermo-E. M. F. and approximately equal to the resistances of the couple and pile respectively. These resistances 57 and 58 may be employed effectively to obtain a corrected zero setting of the galvanometer 48 in compensation or correction of the thermal or parasitic electromotive forces generated in the galvanometer, slide wire, associated resistances and interconnecting conductors. The other ends of the resistances 57 and 58 are connected, respectively, through switches 59 and 60 to opposite sides of the slide wire 52 as shown.

To set up the metering device for the measurement of gas flow therethrough, with gas flowing through the metering tube 1 and with switches 59 and 60 open, switches 50 and 53 are closed to connect the couple and pile into the galvanometer circuit and the slide 56 is adjusted to set the slide wire 52 to give the approximate zero setting of the galvanometer for the gas flow to be measured. When this approximate setting has been obtained, the switches 50 and 53 are opened to disconnect the couple and pile from the galvanometer circuit, and the resistances 57 and 58 are connected into the circuit by closing the switches 59 and 60. The galvanometer 48 will show a small deflection due to thermal or parasitic electromotive forces, if any are preesnt, and the scale of the galvanometer may be adjusted to correct this deflection. With the galvanometer 48 thus corrected to compensate for thermal or parasitic electromotive forces, the switches 59 and 60 are opened to disconnect the resistances 57 and 58, and the switches 50 and 53 are closed to connect the thermocouple and thermopile in circuit with the galvanometer 48 and slide wire 52. The slide 56 of the slide wire is then adjusted until the galvanometer cross-hair is returned to the corrected zero setting, and the reading of the scale of the slide wire 52 is interpolated from a calibration scale, or read from a calibration graph, to give the rate of mass flow of the gas through the metering tube 1. As flow of the gas continues through the meter tube 1, whenever the cross-hair of the galvanometer 48 deviates from the established corrected zero setting, it is returned to that setting by adjustment of the slide 56 in the appropriate direction, and the operator of the gas-flow control valve increases or decreases the rate of gas flow as desired. The flow meter is observed continuously until the gas flow becomes constant and, except when there is no change required in the slide 56, the readings may be recorded every minute or at such intervals as may be necessary. It is important to note that after each reading, it is desirable that the couple and pile should be momentarily disconnected from, and the resistances 57 and 58 connected into, the galvanometer circuit, as aforesaid, to ascertain whether the corrected zero setting has drifted due to changes in the setting of slide 56 and, if so, the zero can readily be further corrected in the manner previously described.

As previously stated, the thermocouple operates in the conventional manner to measure, with respect to two different points, the temperature at which heat is supplied to the gas flowing through the tube 1, and, therefore, since the thermal conductivity of the gas is constant, the rate at which heat is supplied thereto for any given rate of mass flow. When no gas is flowing through the tube 1, the junctions A and B of the thermopile will be at the same temperature since they are equidistant from the heating coil 16. However, when gas flows through the tube 1, the thermopile junction group B, will be at a higher temperature than the junction group A due to the change in temperature of the gas in passing through the heated tube 1, and, since the ratio of the change in temperature between junction groups A and B of the thermopile, to the rate at which heat is supplied to the gas as measured by the thermocouple, is a function of the rate of mass flow of the gas through the tube 1, the ratio of the electromotive force generated by the pile to the electromotive force generated by the couple, which forces are direct functions of the temperature differences measured, is representative of the rate of mass flow of the gas through the tube 1.

The use of a thermocouple or a thermopile alone to measure, with respect to two different points, the rate at which heat is supplied to the gas to thereby determine the rate of mass flow of the gas, is not, of course, new, and the present invention is concerned with the use of two such devices in combination with each other and electrically connected in opposition to each other in opposite arms of a circuit with respect to a suitable current responsive measuring device to render the instrument insensitive to variations in the heat supplied to the gas from or by the heater coil.

From the foregoing, it will be observed that the present invention provides a novel device that is capable of accurately metering gases that are flowing at rates of flow as low as from about 5 to 60 milligrams per second, and at low pressures. In the interest of accurate results it is preferred to operate at pressures at, or above, those at which the mean free path of the molecules of the gas is appreciably less than the diameter of the tube 1. Also the device of the present invention operates efficiently to measure the mass flow of gases rather than the velocity flow thereof, and the device is particularly characterized by the fact that it remains in operative balance regardless of variations in the rate of supply of heat from the heater coil thereby eliminating the necessity for extraneous equipment and devices that otherwise would be required to control and maintain constant the current supplied to the heater coil to maintain the coil at constant temperature.

While a particular embodiment of the invention has been herein illustrated and described, it is not intended that the invention be limited to such disclosure, but that changes and modifications may be made and incorporated therein without departing from the spirit of the invention and the scope of the appended claims.

We claim:
1. A device for measuring the rate of mass flow of gases, comprising an elongated metering tube through which gases to be measured are adapted to flow, a jacket surrounding said metering tube along at least a portion of its length and forming a sealed chamber thereabout, a heater coil in said chamber surrounding said tube and disposed lengthwise thereof centrally with respect to the chamber, said heater coil comprising two coil sections spaced apart a predetermined distance, a thermocouple on said tube having one junction thereof intermediate said heater coil sections and the other junction adjacent one end of said fluid-tight chamber, and a thermopile on said tube comprising a plurality of junctions arranged in two groups disposed at respectively opposite sides of said heater coil and substantially equally spaced from the thermocouple junction disposed intermediate the heater coil sections.

2. A device for measuring the rate of mass flow of gases, comprising an elongated metering tube through which gases to be measured are adapted to flow, a jacket surrounding said metering tube along at least a portion of its length and forming a sealed chamber thereabout, a heater coil in said chamber surrounding said tube and disposed lengthwise thereof with respect to the chamber, said heater coil comprising two coil sections spaced apart a predetermined distance, a thermocouple in said chamber having one junction thereof on said tube intermediate said heater coil sections and the other junction on said tube adjacent one end of said chamber, a thermopile in said chamber comprising a plurality of junctions arranged in two groups disposed on said tube at respectively opposite sides of said heater coil and substantially equally spaced from the thermocouple junction disposed intermediate said heater coil sections, a bridge circuit including a galvanometer and a slide wire resistance for measuring the ratio of the potentials generated by said couple and pile, and means connecting said couple and pile in said circuit so that the couple and pile are disposed in opposite arms of said circuit with respect to said galvanometer.

JESSE W. BEAMS.
LELAND B. SNODDY.
LLEWELLYN G. HOXTON.

REFERENCES CITED

The following references are of record in the file of this patent:

UNITED STATES PATENTS

| Number | Name | Date |
|---|---|---|
| 1,189,785 | Brown | July 4, 1916 |
| 2,193,762 | Hirsch et al. | Mar. 12, 1940 |

FOREIGN PATENTS

| Number | Country | Date |
|---|---|---|
| 799,747 | France | Apr. 11, 1936 |
| 802,705 | France | June 13, 1936 |